(12) United States Patent
Kummer et al.

(10) Patent No.: US 9,097,056 B2
(45) Date of Patent: Aug. 4, 2015

(54) ADJUSTING DEVICE HAVING A SPINDLE DRIVE

(75) Inventors: Frank Kummer, Augsburg (DE); Dietmar Orth, Owingen (DE)

(73) Assignee: Valeo Sicherheitssysteme GmbH, Erdweg (DE)

( * ) Notice: Subject to any disclaimer, the term of this patent is extended or adjusted under 35 U.S.C. 154(b) by 221 days.

(21) Appl. No.: 13/133,336

(22) PCT Filed: Dec. 4, 2009

(86) PCT No.: PCT/EP2009/066439
§ 371 (c)(1),
(2), (4) Date: Aug. 17, 2011

(87) PCT Pub. No.: WO2010/069785
PCT Pub. Date: Jun. 24, 2010

(65) Prior Publication Data
US 2011/0290050 A1 Dec. 1, 2011

(30) Foreign Application Priority Data
Dec. 19, 2008 (EP) .................................... 08172478

(51) Int. Cl.
*F16H 25/20* (2006.01)
*E05F 15/622* (2015.01)

(52) U.S. Cl.
CPC ......... *E05F 15/622* (2015.01); *E05Y 2900/546* (2013.01); *F16H 25/20* (2013.01);
(Continued)

(58) Field of Classification Search
CPC ............ F16H 25/20; F16H 2025/2031; F16H 2025/204; F16H 2025/2075; E05Y 2900/546; E05F 15/1622; Y10T 74/18576; Y10T 74/18648; Y10T 74/18656; Y10T 74/18688

USPC ............ 74/89.23, 89.32, 89.33, 89.34, 89.37, 74/89.39; 296/146.4, 146.8, 56
See application file for complete search history.

(56) References Cited

U.S. PATENT DOCUMENTS 2,410,165 A * 10/1946 Johnson et al. ................ 267/209
2,495,922 A *  1/1950 Dentler ......................... 267/209
(Continued)

FOREIGN PATENT DOCUMENTS

EP              1 840 311 A1    10/2007
JP           2007-010146 A       1/2007
WO     WO 2007025550 A1 *        3/2007

OTHER PUBLICATIONS

International Search Report issued in PCT/EP2009/066439, mailed on Feb. 24, 2010, 2 pages.
(Continued)

*Primary Examiner* — William Kelleher
*Assistant Examiner* — Emily Cheng
(74) *Attorney, Agent, or Firm* — Osha Liang LLP

(57) ABSTRACT

An adjusting device for automatically actuating a vehicle door of a motor vehicle includes first and second tubular housings connected between a body of the vehicle and the door. A spindle drive includes a spindle driven by an electric-motor drive, a spindle nut threaded on the spindle, a push rod that bears the spindle nut, and a tubular guide part enclosing the push rod and the spindle nut. The tubular guide part is provided with a shape complementary to a shape of the spindle nut and secures the spindle nut against rotation. The tubular guide part is produced by a plastic forming process on a suitable metal tube. A cylindrical spring assists the spindle drive enclosing the tubular guide part. Spacers are provided over an outer circumference of the tubular guide part to reduce friction between the cylindrical spring and the tubular guide part.

7 Claims, 3 Drawing Sheets

(52) U.S. Cl.
CPC ... *F16H2025/204* (2013.01); *F16H 2025/2075* (2013.01); *Y10T 74/18576* (2015.01); *Y10T 74/18688* (2015.01)

(56) References Cited

U.S. PATENT DOCUMENTS

| | | | | |
|---|---|---|---|---|
| 2,559,903 | A | * | 7/1951 | Sjolander ..................... 267/135 |
| 4,871,300 | A | * | 10/1989 | Outzen ........................ 417/363 |
| 6,472,778 | B2 | * | 10/2002 | Keller ........................ 310/12.32 |
| 7,478,790 | B2 | * | 1/2009 | Yun ............................. 248/624 |
| 2001/0038174 | A1 | * | 11/2001 | Muller ......................... 267/221 |
| 2003/0083136 | A1 | * | 5/2003 | Park ............................. 464/162 |
| 2003/0136207 | A1 | * | 7/2003 | Bauer .......................... 74/89.33 |
| 2007/0062119 | A1 | * | 3/2007 | Ritter ............................ 49/343 |
| 2009/0133519 | A1 | * | 5/2009 | Lorenzen ................... 74/89.32 |
| 2010/0162839 | A1 | * | 7/2010 | Reif et al. .................. 74/89.38 |

OTHER PUBLICATIONS

Office Action issued in corresponding Japanese Application No. 2011-541303 dated Dec. 10, 2013, and English translation thereof (5 pages).

Patent Abstracts of Japan, Publication No. 2007-010146, Published on Jan. 18, 2007, 1 page.

* cited by examiner

ADJUSTING DEVICE HAVING A SPINDLE DRIVE

The invention relates to an adjusting device having a spindle drive for automatically actuating the vehicle door of a motor vehicle.

In this context, "vehicle door" as used in the text below is understood to include, not only the side doors but also the tailgate or luggage compartment lid of a vehicle.

It is known to use an adjusting device having a spindle drive for automatically opening and closing the side door of a motor vehicle, the spindle drive comprising a spindle, which can be rotated by an electric-motor drive, and a spindle nut which, when the spindle is rotated, can be displaced along the longitudinal axis of the spindle in a guide, from a retracted rest position into an extended position.

Such an adjusting device commonly comprises a first tubular housing including the electric-motor drive and a second tubular housing coupled with the spindle nut and which can be moved telescopically relative to the first housing. Therefore, two connecting devices are provided for respectively connecting the first tubular housing to the body of the vehicle and the second tubular housing to the vehicle door to be adjusted. Moreover, the connecting device for connecting the second tubular housing also secures the spindle nut against rotation.

A drawback of such an arrangement is that it requires a specific ball socket for connecting the vehicle door to be adjusted and the spindle nut.

One object of the invention is to provide an adjusting device having a spindle drive, in which the spindle nut can be mounted fix in rotation in a standard manner and in which said adjusting device can be produced and assembled cost-effectively.

This object is achieved according to the invention by an adjusting device for automatically actuating the vehicle door of a motor vehicle, said device having:
a first tubular housing connected to the body of the vehicle and a second tubular housing connected to the vehicle door to be adjusted, the second tubular housing can be moved telescopically relative to the first housing, and
a spindle drive comprising:
  a spindle, which can be rotated by an electric-motor drive arranged in the first tubular housing,
  a spindle nut threaded with the spindle, which when the spindle is rotated, is displaced along the longitudinal axis of the spindle, from a retracted rest position into an extended position,
  a push rod bearing the spindle nut, which extends in the direction of the longitudinal axis of the spindle, said push rod being coupled to the second tubular housing, and
  a tubular guide part enclosing the push rod and the spindle nut for guiding the spindle nut during its axial displacement,
characterized in that said guide part is provided with a shape complementary to the shape of the spindle nut, to secure the spindle nut against rotation relative to said guide part, and in that said guide part is produced by a plastic forming process on a suitable metal tube.

Such a production of the guide part is optimized and this guide part secures itself the spindle nut against rotation relative to the guide part, without using a specific ball socket for connecting the spindle nut and the door to be actuated.

According further embodiments of the invention:

the shape of said guide part comprises at least one recess portion in which a projecting part of the spindle nut engages, said recess portion is globally rectangular shaped and in that said projecting part is globally T-shaped so that the transverse arm of the T-shaped projection engages said recess portion, the lateral wall of said guide part is provided internally with a guide contour which extends in the axial direction and in which at least one guide lug provided on the outer side of the spindle nut engages, for guiding the spindle nut, said guide part comprises a stop which limits the axial displacement of the spindle nut, the stop is formed by a peripheral inwardly directed bead-shaped projection, a cylindrical spring for assisting the spindle drive encloses said guide part, and said spring is guided by said guide part, spacer means are provided over the outer circumference of said guide part to reduce friction between said spring and said guide part, said guide part has on his external surface notches in which the spacer means are fitted, said guide part is of one-piece design.

Further details and advantages of the invention will become apparent from the exemplary embodiments explained below with reference to figures, in which.

Figure 1:
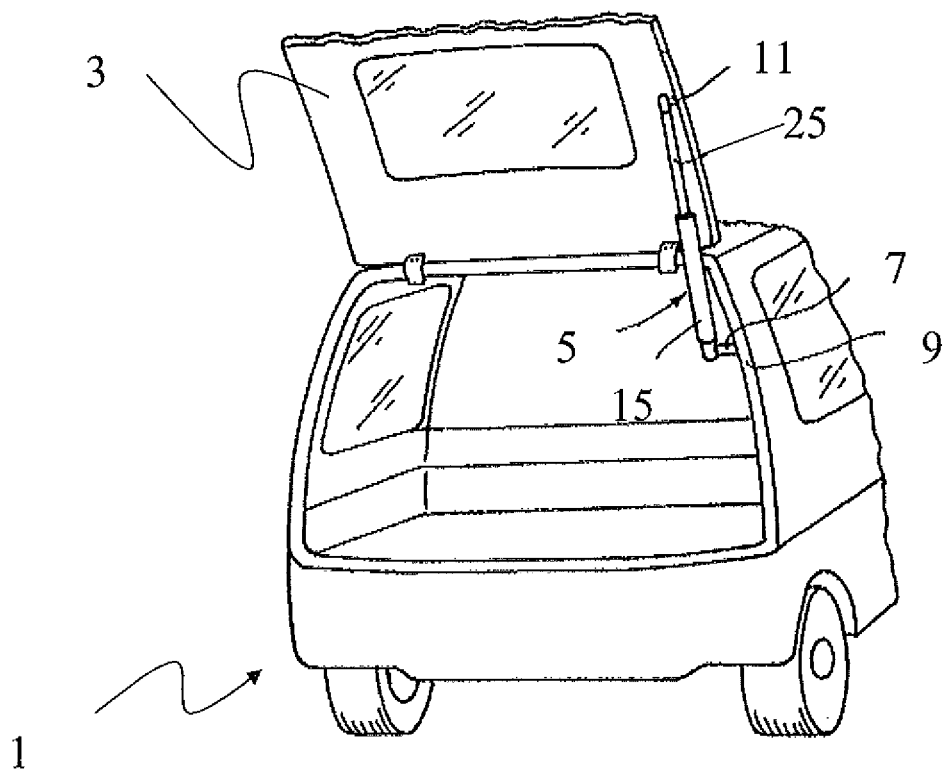
FIG. 1 shows a schematic view of the tail region of a motor vehicle with an opened tailgate and a laterally arranged adjusting device according to the invention.

FIG. 1 indicates by 1 a motor vehicle which has a tailgate 3 which can be pivoted by an adjusting device 5 according to the invention from a closed position into the opened position represented in FIG. 1 and, if appropriate, into the closed position again. The tailgate 3 may also be pivoted by two adjusting devices 5 arranged by instance on opposite sides of the tailgate 3.

The adjusting device 5 according to the invention may also be designed for actuating a side door of a motor vehicle. It is also conceivable to arrange the adjusting device in the hinge-shaft region of the tailgate or for actuation of a sliding roof. Moreover, automatic seat adjustment is also possible by means of the adjusting device according to the invention.

In the illustrated embodiment, the adjusting device 5 is connected via a first connecting device 7 to the body 9 of the motor vehicle 1 and via a second connecting device 11 to the tailgate 3. The connected devices 7,11 may be angle joints. The connecting devices 7,11 comprise respectively a first and a second ball socket 13 in which a ball-ended pin (not illustrated) fixed either to the body 9 of the vehicle or to the tailgate 3 is mounted.

Figure 2:
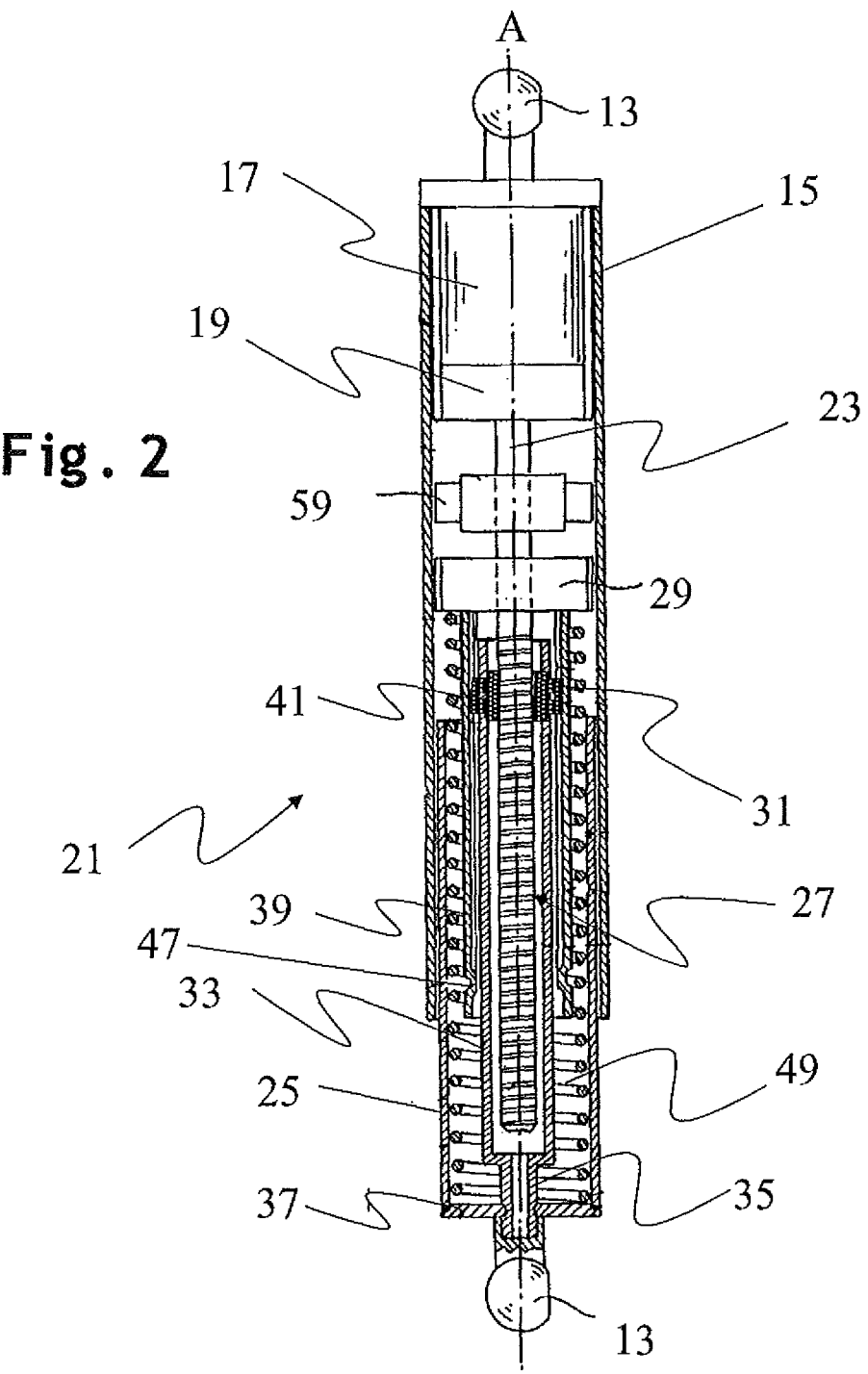
FIG. 2 shows a longitudinal section through the adjusting device according to the invention represented in FIG. 1, having a spindle drive comprising a spindle nut and a tubular guide part.

As can be gathered from FIGS. 1 and 2, the adjusting device 5 comprises a first tubular housing 15 connected to the body 9, in which is located an electric-motor drive comprising an electric motor 17 and a non-self-locking transmission gear unit 19 connected axially downstream.

A spindle drive 21 is connected to the output shaft 23 of the electric-motor drive and acts on a second tubular housing 25 connected to the tailgate 3, which can be pushed out of the first tubular housing 13 and into the latter telescopically.

The spindle drive 21 comprises a spindle 27 being guided laterally on its side facing the transmission gear unit 19 in a spindle bearing 29 connected to the first housing 15, and a spindle nut 31 having an internal thread (not illustrated) engaging with the spindle 27.

The spindle drive 21 also comprises a tubular push rod 33 for bearing the spindle nut 31 and which extends in the direction of the longitudinal axis A of the spindle 27, the push rod 33 projecting beyond the front of the spindle 27. In this case, the front end 35 of the push rod 33 is designed as a coupling part to which both a disc-shaped stop 37 and the second ball socket 25 are fastened.

According to one embodiment of the invention the spindle nut 31 and the push rod 33 are of one-piece design.

Further, a tubular guide part 39 with a guide contour is provided for guiding the spindle nut 31, this guide part 39 enclosing the spindle nut 31 and the push rod 33, and being fastened to the spindle bearing 29.

The spindle nut 31 can be guided by the guide part 39 by providing the spindle nut 31 with a plurality of guide lugs 41 engaging internally in corresponding slots (not illustrated) in the lateral wall of the guide part 39. These guide lugs 41 are for example distributed uniformly over the outer circumference of the spindle nut 31 and have an arrangement in the form of a toothed wheel.

Figure 3:
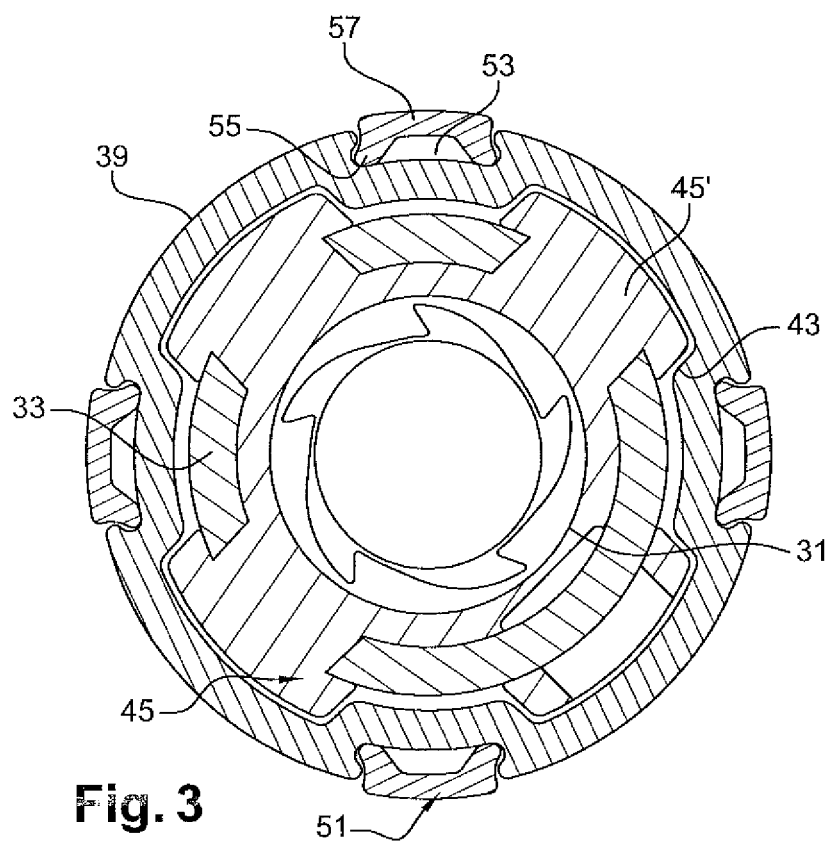
FIG. 3 shows a side view of the spindle nut and the tubular guide part of the spindle drive represented in FIG. 2.

Moreover, taking reference to FIG. 3, a form-closure between the guide part 39 and the spindle nut 31 secures the spindle nut 31 against rotation relative to the guide part 39. In other words, the guide part 39 is provided with a shape complementary to the shape of the spindle nut 31.

Consequently taking reference to FIG. 2, when the spindle 27 is rotated by the electric motor 17, the spindle nut 31 and thus the push rod 33 is displaced along the longitudinal axis A of the spindle 27 along the guide contour of the guide part 39. The second tubular housing 25 being coupled to the push rod 33 is likewise displaced therewith and the tailgate 3 is actuated.

Figure 4:
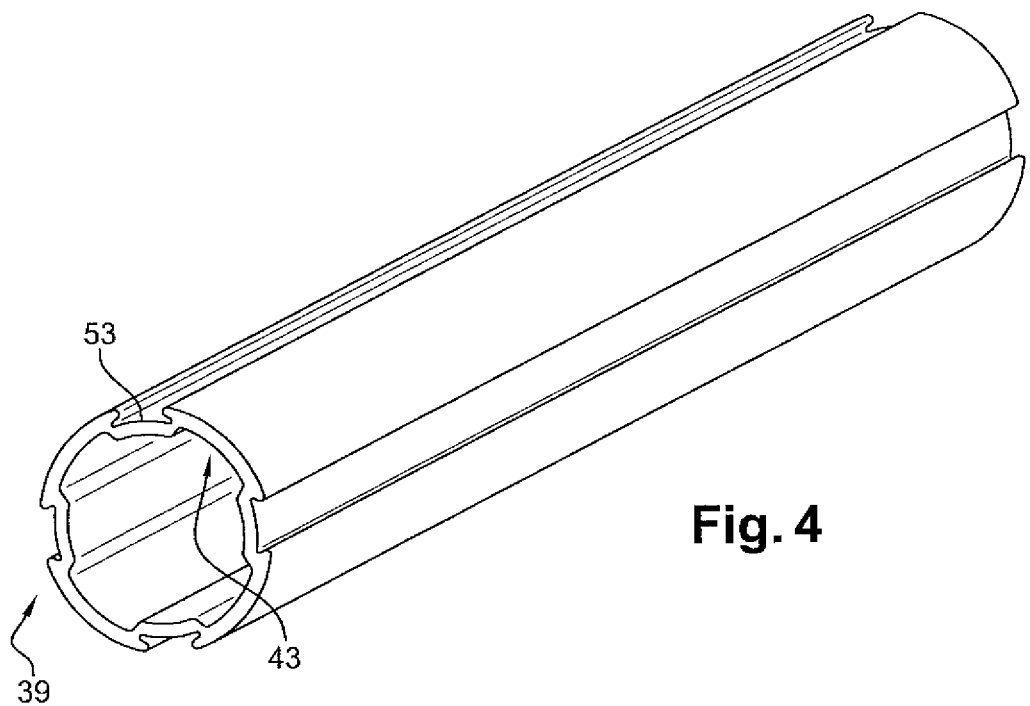
FIG. 4 shows a longitudinal view of the tubular guide part represented in FIG. 3.

As illustrated in FIGS. 3 and 4, the guide part 39 comprises four recess portions 43 uniformly distributed over the inner circumference of the guide part 39 and in which corresponding projecting parts 45 of the spindle nut 31 engage. These recess portions 43 may be globally rectangular shaped and the projecting parts 45 T-shaped so that the transverse arm 45' of the projecting parts 45 engage the recess portions 43.

Thus, the ball socket 13 connecting the spindle nut 31 to the tailgate 3 can be standard as it doesn't secure any more the spindle nut 31 against rotation.

This guide part 39 is produced by a plastic forming process on a suitable metal tube without manufacturing. The plastic forming process is carried out, preferentially in one step, to provide the guide part 39 internally with the guide contour for guiding the spindle nut 31 and with the recess portions 43 for securing the spindle nut 31 against rotation relative to the guide part 39.

Furthermore, the guide part 39 also limits the axial displacement of the spindle nut 31. Referring again to FIG. 2, the tubular guide part 39 may have at its front a peripheral, inwardly directed bead-shaped projection 47 which stops the displacement of the spindle nut 31 from its rest position (FIG. 2) into its extended position (FIG. 1) as soon as the guide lugs 41 come up against this projection 47.

This projection 47 is also provided by the plastic forming process.

Further, the tubular guide part 39 is enclosed by a cylindrical spring 49 which is supported by its first end on the spindle bearing 29 and by its second end on the disc-shaped stop 37. The cylinder spring 49 here is prestressed in the rest position of the spindle nut 31.

The prestressed cylindrical spring 49 is guided by the guide part 39 for assisting the opening/closing movement of the tailgate 3, so that only a relatively small force is required when activating the electric-motor drive to actuate the tailgate 3 into its opened position or its closed position.

In order to reduce friction, spacer means, for example made of plastic, are provided between this spring 49 and the guide part 39.

To improve efficiency, the spacer means comprise at least three ribs 51, in the illustrated embodiment four ribs 51, distributed uniformly over the outer circumference of the guide part 39. The ribs 51 may also be distributed along the length of the guide part 39.

To that end (FIGS. 3-4), the guide part 39 has on its external surface notches 53 in which the ribs 51 are fitted to prevent direct contact between the guide part 39 and the spring 49. These notches 53 are also provided by the plastic forming process.

The ribs 51 may be fitted in the notches 53 by plastic injection. Alternatively, the ribs 51 are prefabricated and are fixed in the notches 53.

The ribs 51 can be provided with a U-shaped cross-section with the legs 55 of the U engaged with a notch 53 and the base 57 of the U over the outer circumference of the guide part 39.

Besides, in order to ensure, when the electric-motor drive is switched off, that the tailgate 3 does not change its position even when the vehicle is in different positions (for example on a slope), the adjusting device 5 may additionally be provided with a controllable braking device 59.

Therefore, following functions:
axial guidance of the spindle nut 31,
securing the spindle nut 31 against rotation relative to the guide part 39,
limiting the axial displacement of the spindle nut 31, and
axial guidance of the spring 47,
are all performed by only one element, which is the guide part 39.

Moreover, a corresponding plastic forming process is carried out on a suitable metal to provide the guide part 39 with all features needed for performing the above cited functions. Of course, the invention is not restricted to the above described embodiment. Thus, for example, the guide part 39 may also allow further function in the spindle drive 21.

The invention claimed is:

1. An adjusting device for automatically actuating a vehicle door of a motor vehicle, said device comprising:
   a first tubular housing connected to a body of the vehicle;
   a second tubular housing connected to the vehicle door to be adjusted, wherein the second tubular housing is moved telescopically relative to the first tubular housing, and
   a spindle drive comprising:
      a spindle, which can be rotated by an electric-motor drive arranged in the first tubular housing,
      a spindle nut threaded with the spindle, which when the spindle is rotated, is displaced along a longitudinal axis of the spindle, from a retracted rest position into an extended position,
      a push rod bearing the spindle nut, which extends in the direction of the longitudinal axis of the spindle, said push rod being coupled to the second tubular housing, and
      a tubular guide part enclosing the push rod and the spindle nut for guiding the spindle nut during its axial displacement,
   wherein said tubular guide part is provided with a shape complementary to a shape of the spindle nut to secure the spindle nut against rotation relative to said tubular guide part, and wherein said tubular guide part is produced by a plastic forming process on a suitable metal tube, and a cylindrical spring for assisting the spindle drive enclosing said tubular guide part, wherein said spring is guided by said tubular guide part, wherein spacer elements are ribs separate from and mounted on said tubular guide part between an outer circumference of said tubular guide part and said cylindrical spring to reduce friction between said cylindrical spring and said tubular guide part, and wherein said tubular guide part comprises, on an external surface, notches in which the ribs are fitted.

2. The adjusting device according to claim 1, wherein the shape of said tubular guide part comprises at least one recess portion into which a projecting part of the spindle nut engages.

3. The adjusting device according to claim 2, wherein said at least one recess portion is rectangular shaped and said projecting part is T-shaped so that a transverse arm of the T-shaped projection engages said at least one recess portion.

4. The adjusting device according to claim 1, wherein a lateral wall of said tubular guide part is provided internally with a guide contour which extends in the axial direction and in which at least one guide lug provided on an outer side of the spindle nut engages, for guiding the spindle nut.

5. The adjusting device according to claim 1, wherein said tubular guide part comprises a stop which limits the axial displacement of the spindle nut.

6. The adjusting device according to claim 5, wherein the stop is formed by a peripheral inwardly directed bead-shaped projection.

7. The adjusting device according to claim 1, wherein said tubular guide part is of one-piece design.

* * * * *